(12) United States Patent
Herzer et al.

(10) Patent No.: US 7,570,223 B2
(45) Date of Patent: Aug. 4, 2009

(54) ANTENNA CORE AND METHOD FOR PRODUCTION OF AN ANTENNA CORE

(75) Inventors: Giselher Herzer, Bruchkoebel (DE); Franz Till, Hassselroth (DE); Harald Hundt, Hasselroth (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 0 days.

(21) Appl. No.: 11/186,046

(22) Filed: Jul. 21, 2005

(65) Prior Publication Data

US 2006/0017642 A1      Jan. 26, 2006

Related U.S. Application Data

(63) Continuation of application No. PCT/EP2004/000235, filed on Jan. 15, 2004.

(30) Foreign Application Priority Data

Jan. 23, 2003    (DE) .................................. 103 02 646

(51) Int. Cl.
*H01Q 7/08* (2006.01)
(52) U.S. Cl. ...................... 343/787; 343/788
(58) Field of Classification Search .............. 343/787, 343/788, 713
See application file for complete search history.

(56) References Cited

U.S. PATENT DOCUMENTS

| | | | |
|---|---|---|---|
| 4,150,981 A | 4/1979 | O'Handley | 75/170 |
| 4,265,684 A * | 5/1981 | Boll | 148/121 |
| 4,483,724 A | 11/1984 | Hasegawa | 148/31.55 |
| 4,709,471 A | 12/1987 | Valencic et al. | 29/605 |
| 5,181,311 A | 1/1993 | Lee | 29/609 |
| 5,408,243 A * | 4/1995 | D'Hont | 343/718 |
| 5,567,537 A * | 10/1996 | Yoshizawa et al. | 428/800 |
| 5,625,366 A | 4/1997 | D'Hont | 343/718 |
| 5,638,080 A | 6/1997 | Orthmann et al. | 343/788 |
| 6,737,951 B1 * | 5/2004 | Decristofaro et al. | 336/234 |
| 2002/0033777 A1 | 3/2002 | Maruyama et al. | 343/713 |
| 2006/0022886 A1 | 2/2006 | Hein et al. | 343/787 |

FOREIGN PATENT DOCUMENTS

DE      40 02 999 A1      2/1990

(Continued)

OTHER PUBLICATIONS

International Search Report, PCT/EP2004/000235, 5 pgs., Oct. 4, 2004.

(Continued)

*Primary Examiner*—Michael C Wimer
(74) *Attorney, Agent, or Firm*—King & Spalding L.L.P.

(57) ABSTRACT

An antenna core comprises a flexible stack of a plurality of oblong soft-magnetic strips consisting of an amorphous or nanocrystalline alloy. The strips of said antenna core are separated from one another by an electrically insulating film each. The amorphous or nanocrystalline alloy has a magnetostriction value lambdas in the range of +4 <·>10<−6> to −4<·>10<−6> and a linear BH loop. The coefficient of induction L of the antenna core changes at 60 kHz at a center distortion by 25% of its length by less than 10% and the quality Q of the antenna core is >=10 at 60 kHz.

14 Claims, 2 Drawing Sheets

FOREIGN PATENT DOCUMENTS

| | | |
|---|---|---|
| DE | 41 09 840 A1 | 3/1991 |
| DE | 195 13 607 C2 | 4/1995 |
| EP | 0 121 649 | 1/1984 |
| EP | 0 256 347 A1 | 7/1987 |
| EP | 0 401 805 A2 | 6/1990 |
| EP | 0 554 581 A1 | 2/1992 |
| EP | 0 762 535 B1 | 8/1996 |
| JP | 60 233 904 A | 11/1985 |
| JP | 60233904 | 11/1985 |
| JP | 05267922 | 10/1993 |
| JP | 2002 261524 A | 9/2002 |
| JP | 2002261524 | 9/2002 |

OTHER PUBLICATIONS

International Search Report with Written Opinion PCT/EP2004/000235, 7 pages, mailing date Sep. 2, 2005.
International Search Report for International Report Application No. PCT/EP03/00699 (3 pages), Nov. 6, 2003.

* cited by examiner

ANTENNA CORE AND METHOD FOR PRODUCTION OF AN ANTENNA CORE

CROSS REFERENCE TO RELATED APPLICATION

This application is a continuation of co-pending International Application No. PCT/EP2004/000235 filed Jan. 15, 2004 which designates the United States, and claims priority to German Application No. 10302646.0 filed Jan. 23, 2003.

TECHNICAL FIELD

The invention concerns an antenna core, consisting of a flexible stack of several elongated soft magnetic strips made of an amorphous or nanocrystalline alloy.

BACKGROUND

Such an antenna core is known, for example, from U.S. Pat. No. 5,567,537, in which the use of specific amorphous and nanocrystalline alloys is described for production of so-called thin film antennas. Among other things, retention of soft magnetic and physical properties before and after a bending load is discussed there as criterion for good applicability of such thin film antennas, for example, in chip cards. In particular, it is demonstrated that such thin film antennas exhibit no cracks after bending loads, in contrast to ferrite rods.

SUMMARY

For antennas that undergo strong deformations, the antenna cores made of amorphous and nanocrystalline alloys, known from U.S. Pat. No. 5,567,537, however, are unsuitable.

The task of the present invention is therefore to provide simultaneously a selection of appropriate alloys and a new structure of antenna cores, which are deformable without a significant loss in inductance L and Q factor of the antenna by deformation.

Another task of the invention is to find a production method for such an antenna core that is inexpensive and can be used industrially.

The task is solved according to the invention by an antenna core of the type just mentioned, characterized by the fact that the strips are separated from each other by an electrically insulating foil, that the amorphous or nanocrystalline alloy has a magnetostriction $\lambda_s$ in the range from $+4 \cdot 10^{-6}$ to $-4 \cdot 10^{-6}$, as well as a linear B-H loop, and that the inductance L of the antenna core at 60 kHz changes by less than 10% during bending in the center by 25% of its length and the Q factor is $\geq 10$ at f=60 kHz. The Q factor is defined as $Q = \omega \cdot L/R$, in which $\omega = 2\pi f$ and L is the inductance and R the resistance, including the antenna core losses.

By using electrically insulating foils that preferably consist of plastic and typically have a thickness from 0.5 to 30 µm, laminates are produced that guarantee very good deformability.

It was found in different experiments that the stacks known from the prior art, which were glued with adhesives, like epoxy resin, have unreliable insulation between the band layers of the soft magnetic bands, which led to sharply deviating quality values. This entailed distortions of the soft magnetic alloy bands, which again entailed instability of the inductances.

Consequently, the natural insulation layer related to production on the surface of soft magnetic alloy bands is generally fully insufficient to guarantee high quality values Q and reliable resistance during deformation.

The soft magnetic alloy bands always have a surface structure that alternates over the band length, because of the production process, which has, for example, elevations and recesses. Such elevations touch the neighboring band layers and permit electrical contacting with frequently fluctuating transfer resistance as a function of many factors.

The use of plastic insulating foils has been shown to be quite reliable, so that antenna cores can be produced, having high and stable quality values Q. This full-surface insulation between all band layers suppresses any eddy currents between the individual band layers. Consequently, only the thickness of the individual soft magnetic alloy bands and their electrical conductivity are decisive as criteria for quality.

Preferably, the alloy bands have a thickness from 5 to 30 µm.

The antenna cores according to the invention are produced by a new method, comprising the following steps:

a) An amorphous alloy band is cast by means of the rapid solidification technique;

b) In the amorphous alloy band, by heat treatment in the magnetic field, the soft magnetic properties (for example, permeability, shape of the B-H loop, coercivity-field intensity, magnetostriction) are set;

c) One or more soft magnetic alloy bands are wound together with an electrically insulating foil to a toroid, in which each individual band layer is insulated from the adjacent band layers by the foil;

d) The wound toroid is separated at one site, unfolded and reshaped to the elongated antenna core.

In a modification of the method according to the invention, the following step is connected:

e) The elongated antenna core is mechanically stabilized to a wound package.

In this case, the antenna core, on the one hand, can be positioned between two rectangular flat rods. The sandwich formed in this case can be shaped into a rod-like wound package by winding with adhesive tape. The reshaped antenna core can also be modified to a wound package with a curable resin.

It is also conceivable to insert the unfolded antenna core into a U-shaped profile and bring it to its final shape by winding with adhesive tape.

The inductance of the rod antenna is then tuned, in which the magnetic iron cross section $A_{Fe}$ of the antenna core, before stabilization to the wound package, is adjusted to the inductance value necessary later for the antenna by incorporating or removing individual band layers or sections of band layers.

As an alternative or in addition, the inductance of the rod antenna, however, can also be tuned by adjusting the winding of the antenna core to the inductance later necessary for the antenna by insertion or removal of individual windings.

In addition, the inductance in the antenna can be tuned by adjusting winding of the foil stack by displacement of the winding or individual windings relative to the length of the antenna core to the necessary inductance value to the antenna.

Either wire, preferably enameled copper wire, or cable are considered as winding for the antenna being produced.

In a modification of the present invention, during winding of the toroid, the n-fold number of band layers are wound for each antenna core. After separation of the toroid, a number n of stacks is formed. By separation of the stacks in the shell, n antenna cores are then obtained.

Typically, regular recesses are introduced into the edges of the antenna core, into which the winding wires are secured for the antenna winding. In addition, the spacing and position of the winding is clearly defined on the antenna core.

In a special embodiment, the formed antenna stack is positioned between two fiber mats, also called prepregs, preimpregnated with casting resin and precured. The assembly so produced is then pressed to a body with a freely shaped geometry in a heated mold. The body is finally fixed by curing of the resin in this mold.

BRIEF DESCRIPTION OF THE DRAWINGS

The invention is described below with reference to the drawing. In the drawing.

DETAILED DESCRIPTION

Figure 1:
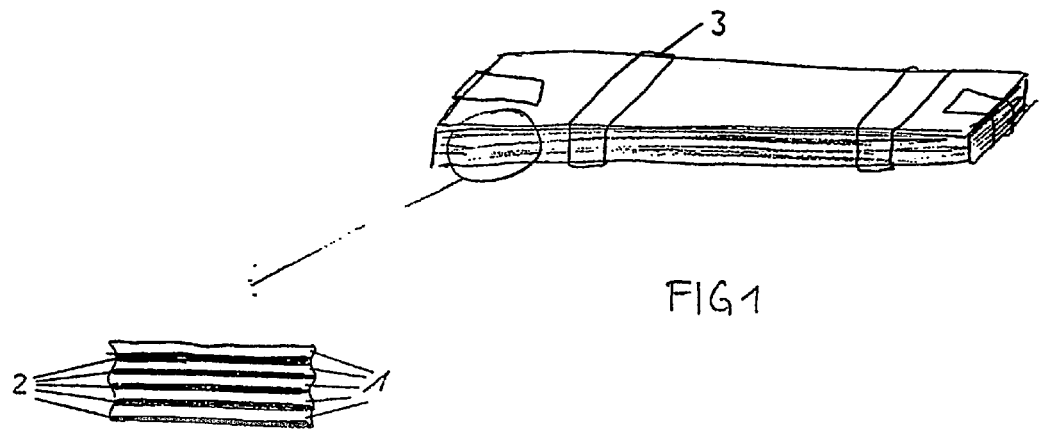
FIG. 1 shows the structure of an antenna core according to the invention.

As can be gathered from FIG. 1, the antenna core according to the present invention consists of several elongated soft magnetic strips 1, layered in alternation, made from an amorphous or nanocrystalline alloy. Between strips 1, insulating foils 2 are present, which insulate the strips 1 electrically from each other. In addition, the antenna core is stabilized and fixed with some adhesive tape 3.

Figure 2:
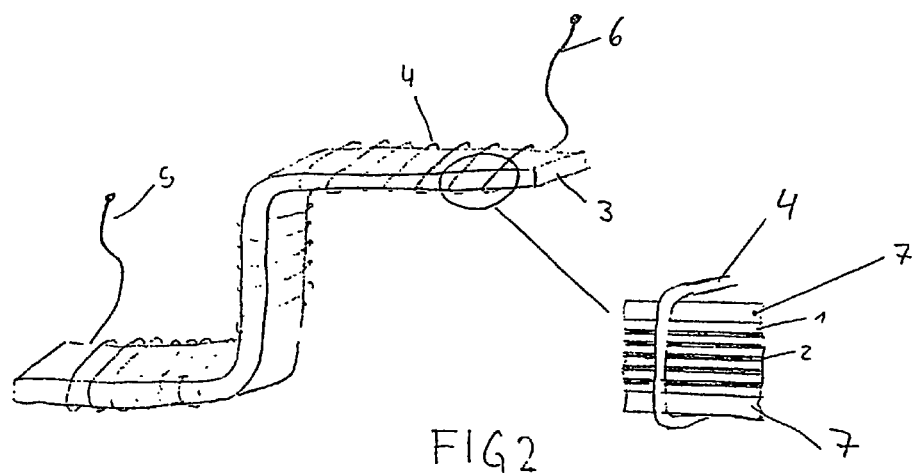
FIG. 2 shows a finished wound antenna, consisting of an antenna core according to the invention and a winding.

It is apparent from FIG. 2 that an antenna according to the invention, from an elongated antenna core 8, is provided, which is provided with a winding 4. The ends 5 and 6 of the winding 4 permit supply and takeoff of electrical current.

The elongated antenna core was also provided here for stabilization with stiffening strips 7, consisting of plastic, positioned on the bottom and top.

By using soft magnetic strips made of an amorphous or nanocrystalline alloy with the least possible magnetostriction $\lambda_s$, which lies between $+4\cdot10^{-6}$ to $-4\cdot10^{-6}$, preferably $+1\cdot10^{-6}$ to $-1\cdot10^{-6}$, the significant bending of the antenna core, apparent from FIG. 2 by 2 times 9 degrees, is possible without significant alternation of the soft magnetic and physical properties.

Figure 3:
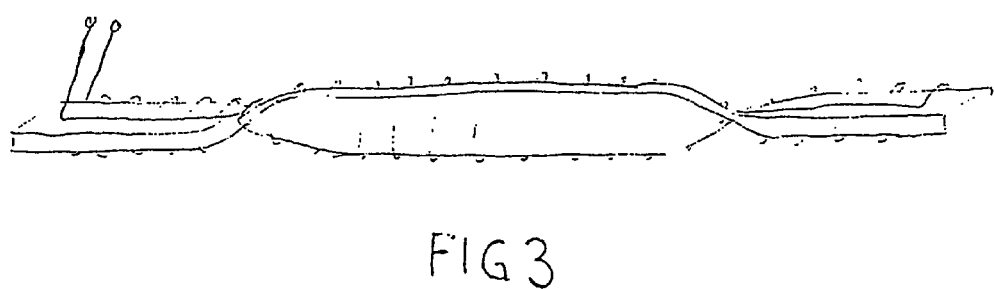
FIG. 3 shows an alternative embodiment of a finished wound antenna.

Another alternative variant of an antenna core according to the invention is apparent from FIG. 3. Here again, there is the possibility of adjusting to any necessary incorporation circumstances by multiple torsion of the stack forming the antenna core, without adversely affecting the electrical and magnetic properties. In the depicted practical example, the two current connections of the winding were only brought out on one side.

Figure 4:
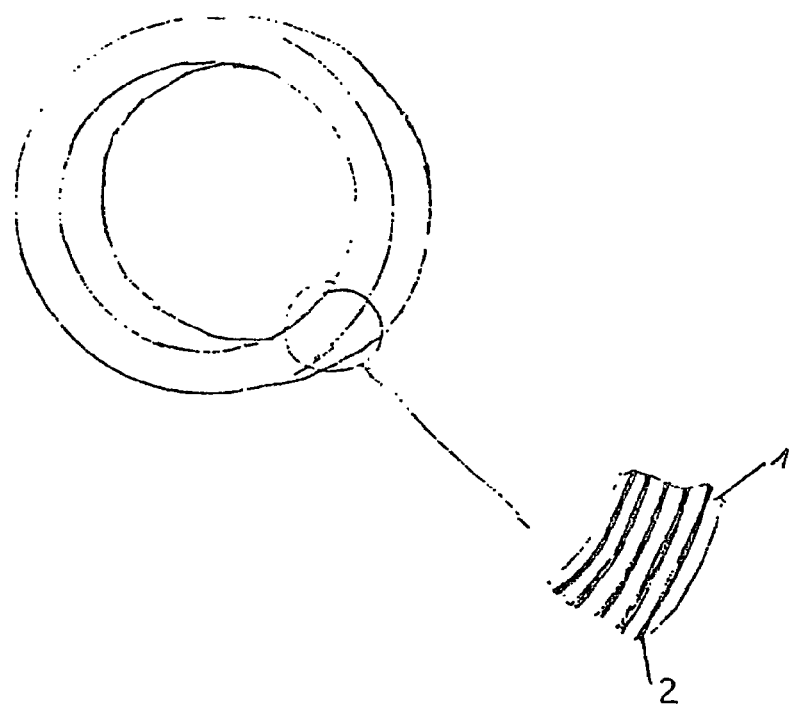
FIG. 4 shows an antenna core wound to a toroid in bifilar fashion.

As can be gathered from FIG. 4, an amorphous alloy band is cast by means of the fast solidification technique, which is then adjusted, with respect to its soft magnetic properties, by means of heat treatment in the magnetic field.

Depending on whether it is prescribed to use an amorphous alloy or a nanocrystalline alloy, adjustment of the nanocrystalline structure occurs following this heat treatment.

The amorphous alloys are generally cobalt-based alloys and the nanocrystalline alloys are generally iron-based alloys. Both alloy systems have long been known in the technical world and are described, for example, in the originally cited U.S. Pat. No. 5,567,537.

The alloy bands are then wound together with an electrically insulating foil, preferably consisting of plastic and typically having a thickness from 0.5 to 30 µm, in bifilar fashion to a toroid. Each individual band layer of the amorphous or nanocrystalline alloy bands is then electrically insulated from the adjacent band layers by the foil. The finished wound toroid is shown in FIG. 4.

Figure 5:
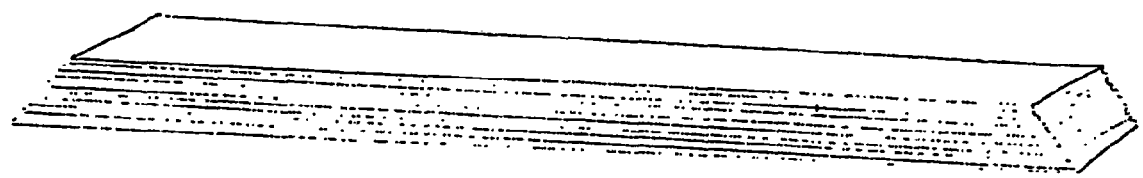
FIG. 5 shows an antenna core according to the invention produced by cutting the toroid from FIG. 4 and then unfolding it.

This finished wound toroid is then separated at one site, unfolded and reformed to the elongated antenna core, which is typically configured trapezoidal after unfolding on both ends, which is apparent from FIG. 5.

In order to demonstrate the effects of the structure according to the invention in the properties of the antenna, comparative measurements were conducted on sample antennas with the following alloys:

TABLE 1

| No. | Composition (at %) | $|\lambda_s|$ (ppm) |
|---|---|---|
| 1 | $Fe_{3.5}Co_{69.5}Mo_3Nb_1Si_{16}B_7$ | <0.2 |
| 2 | $FE_{6.5}Co_{50.5}Ni_{20}Si_9B_{14}$ | 0.6 |
| 3 | $FE_{24}Co_{12}Ni_{46}Si_2B_{16}$ | 11 |

As an example for an antenna, a stack of amorphous alloy bands made of alloy no. 1, constructed in bifilar fashion, which is now produced under the trade name Vitrovac® 6025 by the applicant, was produced. The employed alloy bands then had a thickness of 23±3 µm. A plastic film made of Hostaphan® with a thickness of 6 µm was used as foil.

The soft magnetic amorphous alloyed band, before processing to a stack, underwent field heat treatment across the band direction at a temperature of 200° C. with a duration of about 18 hours. The resulting B-H loop was a largely linear F-loop with a relatively small remanence ratio of <0.3.

The dimensions of the produced antenna core according to the invention were:

Length 750 mm, width 20 mm, 48 band layers of amorphous alloy band. The antenna core was provided with a winding with 110 windings made of enameled copper wire with a diameter of 0.5 mm. The wound length of the antenna was about 700 mm centered.

As an alternative to this antenna, an antenna B with identical dimensions, made of an identical starting material, was produced, but without the foil insulation according to the invention.

As another alternative, an antenna C, with identical dimensions and from a magnetic band 17±3 µm thick, was also produced, but without foil insulation. The soft magnetic alloy band was subjected, however, to field heat treatment along the band direction before processing to an antenna, which led to a so-called Z-loop, i.e., a strongly nonlinear rectangular B-H loop with a high remanence ratio of >0.7.

In addition, an antenna was produced from a slightly magnetostrictive alloy 2 from Table 1 with a foil insulation (D) and without foil insulation (E). The soft magnetic amorphous alloy band was also subjected to field heat treatment across the band direction before processing to a stack, in which heat treatment was carried out for 6 seconds at a temperature of 310° C. and the magnetic field was applied across the band direction. A largely linear, flat B-H loop was again achieved.

The properties listed in Table 2 were then measured in the straight state and in the deformed state. Deformation was produced by center bending of the corresponding antenna core by 20 cm.

TABLE 2

|  | A | B | C | D | E | F |
|---|---|---|---|---|---|---|
| Inductance L in µH (at 60 kHz, 100 mV) | | | | | | |
| Straight | 748 | 423 | 106 | 836 | 518 | 300 |
| Deformed | 748 | 384 | 112 | 897 | 582 | 323-337 |
| Straight again | 748 | 487 | 106 | 836 | 518 | 312.5 |
| After loosening | 748 | 460 | 106 | 836 | 493 | 302.5 |
| Quality Q (at 60 kHz, 100 mV) | | | | | | |
| Straight | 20.3 | 1.9 | 3.7 | 17.8 | 1.8 | 24 |
| Deformed | 20.3 | 1.85 | 4.3 | 15.1 | 2.04 | 15 |
| Straight again | 20.3 | 2.11 | 3.7 | 17.8 | 1.8 | 18 |
| After loosening | 20.3 | 2.0 | 3.7 | 17.8 | 1.77 | 25 |

Whereas examples A and D, which correspond to the present invention, have high inductance L, largely independent of deformation with simultaneously high quality Q, the comparative examples B, C, E and F from the prior art exhibit distinctly poorer and partially more stress-sensitive inductance L.

In the case of examples B, C and E, they also have much poorer quality Q.

In particular, in examples B and E, in comparison with the variants A and D according to the invention, irreversible changes were obtained in inductance as soon as the antenna stack was deformed and then bent straight again.

In addition, it was conspicuous that in the case of the comparative example C, a particularly smaller value of inductance resulted. In comparative example C, the B-H loop is rectangular. The small inductance value is all the more surprising, since the rectangular B-H loop is much steeper than the linear loop of the other examples, so that a much higher average permeability is present there. Much better inductance should therefore have occurred.

Comparative example F also showed extremely unstable measured values and very high sensitivity to mechanical loads.

In another experiment, another antenna sample with a torsion load by 180° or bending to a closed ring (circular form) was measured. For this purpose, an antenna (G) was produced from a stack, constructed in bifilar fashion, from amorphous alloy bands made with alloy no. 1 of Table 1 with a thickness of 23±3 µm and a foil made of plastic Hostaphan® with a thickness of 6 µm. The soft magnetic amorphous alloy band, before processing to a stack, underwent field heat treatment across the band direction, so that a largely linear flat B-H loop was present.

The dimensions of the produced antenna were: length 750 mm, width 20 mm, 60 band layers with a winding with 88 windings made of enameled copper wire with a diameter of 0.5 mm. The wound length in the center was about 700 mm.

The antenna cores again exhibited excellent properties (Table 3) in terms of inductance L and quality Q.

TABLE 3

|  | G |
|---|---|
| Inductance L in µH (at 60 kHz, 100 mV) | |
| Straight | 756 |
| Circular form | 855 |

TABLE 3-continued

|  | G |
|---|---|
| Straight again | 756 |
| Torsion 180° | 756 |
| Quality Q (at 60 kHz, 100 mV) | |
| Straight | 22.2 |
| Circular form | 19.7 |
| Straight again | 22.2 |
| Torsion 180° | 22.2 |

Overall, excellently loadable antenna cores can be produced with the present invention, which can also be produced simply and on an industrial scale.

The antenna cores according to the present invention can be used in detection systems for theft security systems in the transmitting and/or receiving antennas. Such theft security systems are described, for example, in EP 0 121 649 B2 or U.S. Pat. No.4,150,981.

What is claimed is:

1. An antenna core, comprising a flexible stack of several elongated soft magnetic strips made of an amorphous or nanocrystalline alloy,
   wherein
      the strips are separated from each other by an electrically insulating foil and underwent a heat treatment before being processed to the flexible stack, wherein during the heat treatment a magnetic field was applied to said strips,
      the amorphous and nanocrystalline alloy has a magnetostriction value $\lambda_s$ in the range from $+4 \cdot 10^{-6}$ to $-4 \cdot 10^{-6}$, as well as a linear B-H loop, and
      wherein at least one of the inductance L of the antenna core at 60 kHz and the quality Q of the antenna at 60 kHz does not vary when a torsion of 180° is applied to said antenna core.

2. An antenna core according to claim 1, wherein the electrically insulating foils consist of plastic.

3. An antenna core according to claim 2, wherein the foils have a thickness from 0.5 to 30 µm.

4. An antenna core according to claim 1, wherein the elongated soft magnetic strips have a thickness from 5 to 30 µm.

5. An antenna core according to claim 1, wherein the amorphous or nanocrystalline alloy has a magnetostriction value $\mu_s$ in the range from $+1 \cdot 10^{-6}$ to $-1 \cdot 10^{-6}$.

6. Use of an antenna core according to claim 1 as a transmitting and/or receiving antenna in a detection system for theft security.

7. An antenna core according to claim 1, wherein the heat treatment is performed at a temperature of 310° C.

8. An antenna core according to claim 1, wherein the heat treatment is performed for 6 seconds.

9. An antenna core, comprising a flexible stack of several elongated soft magnetic strips made of an amorphous or nanocrystalline alloy having a thickness from 5 to 30 µm, the strips being separated from each other by an electrically insulating foil and underwent a heat treatment before processed to the flexible stack, wherein during the heat treatment a magnetic field was applied to said strips, wherein the amorphous and nanocrystalline alloy has a magnetostriction value $\lambda_s$ in the range from $+4 \cdot 10^{-6}$ to $-4 \cdot 10^{-6}$, as well as a linear B-H loop, and wherein at least one of the inductance L of the antenna core at 60 kHz and the quality Q of the antenna at 60 kHz does not vary when a torsion of 180° is applied to said antenna core.

10. An antenna core according to claim 9, wherein the electrically insulating foils consist of plastic.

11. An antenna core according to claim 9, wherein the elongated soft magnetic strips have a thickness from 5 to 30 μm.

12. An antenna core according to claim 9, wherein the amorphous or nanocrystalline alloy has a magnetostriction value $\mu_s$ in the range from $+1 \cdot 10^{-6}$ to $-1 \cdot 10^{-6}$.

13. An antenna core according to claim 9, wherein the heat treatment is performed at a temperature of 310° C.

14. An antenna core according to claim 9, wherein the heat treatment is performed for 6 seconds.

* * * * *